US008141895B2

(12) United States Patent
Haut et al.

(10) Patent No.: US 8,141,895 B2
(45) Date of Patent: Mar. 27, 2012

(54) COLLAPSIBLE STROLLER AND METHOD OF OPERATING THE SAME

(75) Inventors: Robert E. Haut, West Chester, PA (US); Schantal M. Kane, Downingtown, PA (US)

(73) Assignee: Wonderland Nurserygoods Company Limited, Hong Kong (HK)

( * ) Notice: Subject to any disclaimer, the term of this patent is extended or adjusted under 35 U.S.C. 154(b) by 185 days.

(21) Appl. No.: 12/728,417

(22) Filed: Mar. 22, 2010

(65) Prior Publication Data

US 2010/0237589 A1 Sep. 23, 2010

Related U.S. Application Data

(60) Provisional application No. 61/210,856, filed on Mar. 23, 2009.

(51) Int. Cl.
*B62B 1/12* (2006.01)
(52) U.S. Cl. ......... 280/642; 280/647; 280/649; 280/650
(58) Field of Classification Search .................. 280/642, 280/643, 647–650, 658
See application file for complete search history.

(56) References Cited

U.S. PATENT DOCUMENTS

| | | | | |
|---|---|---|---|---|
| 4,906,017 A | * | 3/1990 | Kassai | 280/642 |
| 5,472,224 A | * | 12/1995 | Jane Cabagnero | 280/642 |
| 5,622,377 A | * | 4/1997 | Shamie | 280/642 |
| 5,645,293 A | * | 7/1997 | Cheng | 280/642 |
| 5,823,564 A | * | 10/1998 | Kettler | 280/642 |
| 5,865,460 A | * | 2/1999 | Huang | 280/642 |
| 5,938,229 A | * | 8/1999 | Chen et al. | 280/642 |
| 6,102,432 A | * | 8/2000 | Cheng | 280/642 |
| 6,196,571 B1 | * | 3/2001 | Chen et al. | 280/647 |
| 6,276,709 B1 | * | 8/2001 | Chen et al. | 280/650 |
| 6,626,452 B2 | * | 9/2003 | Yang et al. | 280/643 |
| 6,682,090 B2 | * | 1/2004 | Chen | 280/642 |
| 6,698,773 B2 | * | 3/2004 | Hsia | 280/47.38 |
| 6,755,435 B2 | * | 6/2004 | Hsia | 280/649 |
| 6,877,761 B2 | * | 4/2005 | Hsia | 280/642 |
| 6,886,851 B2 | * | 5/2005 | Chen | 280/642 |
| 6,908,100 B2 | * | 6/2005 | Kassai et al. | 280/642 |
| 6,976,686 B2 | * | 12/2005 | Hsia | 280/47.38 |
| 7,007,968 B2 | * | 3/2006 | Yamazaki et al. | 280/647 |

(Continued)

FOREIGN PATENT DOCUMENTS

CN 200720125916.5 6/2008

(Continued)

*Primary Examiner* — J. Allen Shriver, II
*Assistant Examiner* — Erez Gurari
(74) *Attorney, Agent, or Firm* — David I. Roche; Baker & McKenzie LLP (57) ABSTRACT

A stroller comprises a support frame and a handle, and a seat assembled between the support frame and the handle. A front leg is coupled with a rear leg via a first pivot link, and a side segment of the handle is movable relative to the front and rear leg. The seat has a front portion pivotally connected with the front leg, and a rear portion pivotally connected with the side segment of the handle. The side segment is in stable abutment against a contact region of the support frame adjacent to the first pivot link for supporting the seat. For folding the stroller, the handle is moved in a first direction that raises the side segment above the support frame for displacing the contact region of the support frame in a forward direction to a disengaged position out of reach for the lower end portion of the side segment.

20 Claims, 5 Drawing Sheets

U.S. PATENT DOCUMENTS

| | | | |
|---|---|---|---|
| 7,044,497 B2 * | 5/2006 | Hartenstine et al. | 280/642 |
| 7,077,420 B1 * | 7/2006 | Santoski | 280/642 |
| 7,114,743 B2 * | 10/2006 | Kassai et al. | 280/650 |
| 7,118,121 B2 * | 10/2006 | Cheng et al. | 280/642 |
| 7,140,634 B2 * | 11/2006 | Kassai et al. | 280/642 |
| 7,374,196 B2 | 5/2008 | Hartenstine et al. | |
| 7,410,185 B2 * | 8/2008 | Chen et al. | 280/642 |
| 7,413,213 B2 * | 8/2008 | Pike et al. | 280/642 |
| 7,506,890 B2 * | 3/2009 | Chen | 280/647 |
| 7,571,925 B2 * | 8/2009 | Pike et al. | 280/642 |
| 7,614,641 B2 * | 11/2009 | Hartenstine et al. | 280/642 |
| 7,694,995 B2 * | 4/2010 | Dotsey et al. | 280/642 |
| 7,780,183 B2 * | 8/2010 | Chen et al. | 280/647 |
| 7,871,100 B2 * | 1/2011 | Chen et al. | 280/642 |
| 2001/0040357 A1 * | 11/2001 | Barrett et al. | 280/648 |
| 2003/0052475 A1 * | 3/2003 | Suga et al. | 280/642 |
| 2003/0164606 A1 * | 9/2003 | Chen | 280/642 |
| 2003/0201625 A1 * | 10/2003 | Espenshade et al. | 280/642 |
| 2004/0183275 A1 * | 9/2004 | Chen | 280/642 |
| 2005/0242549 A1 * | 11/2005 | Longenecker et al. | 280/642 |
| 2005/0258620 A1 * | 11/2005 | Pike et al. | 280/647 |
| 2006/0255565 A1 * | 11/2006 | Hartenstine et al. | 280/642 |
| 2007/0052208 A1 * | 3/2007 | Chen et al. | 280/642 |
| 2007/0222188 A1 * | 9/2007 | Dean et al. | 280/642 |
| 2007/0257472 A1 * | 11/2007 | Hartenstine et al. | 280/642 |
| 2008/0073879 A1 * | 3/2008 | Chen et al. | 280/642 |
| 2008/0079240 A1 * | 4/2008 | Yeh | 280/642 |
| 2008/0277905 A1 * | 11/2008 | Hartenstine et al. | 280/642 |
| 2009/0152836 A1 * | 6/2009 | Pike et al. | 280/650 |
| 2010/0127481 A1 * | 5/2010 | Funakura | 280/658 |
| 2010/0237589 A1 * | 9/2010 | Haut et al. | 280/642 |

FOREIGN PATENT DOCUMENTS

| | | |
|---|---|---|
| CN | 200720184473.7 | 11/2008 |

* cited by examiner

COLLAPSIBLE STROLLER AND METHOD OF OPERATING THE SAME

CROSS-REFERENCE TO RELATED U.S. APPLICATION

This application claims priority of U.S. provisional application No. 61/210,856 filed on Mar. 23, 2009.

BACKGROUND OF THE INVENTION

1. Field of the Invention

The present invention relates to a stroller, and more particularly to a collapsible stroller apparatus and method of operating the same.

2. Description of the Related Art

Parents can use strollers to transport babies and small children while shopping and walking. The stroller is typically constructed of a metal frame, which consists of a combination of assembled metal and plastic components, and a body which connects or wraps around the frame. When it is not used, the stroller can usually be folded for storage or transport.

The folded size of a stroller is very important to parents as they transport these products in their cars, on planes, busses and trains as well as storing them in the home. To meet these requirements, some design approaches propose a folding mechanism that can collapse the seat rearward and fold the handle such that the handle, the seat and the front and rear legs lie substantially adjacent to one another in the folded state. While this approach can fold the stroller in a compact manner, improvements in term of safety may still be needed. For example, it may be desirable to provide a folding mechanism that can effectively prevent accidental folding of the stroller.

Therefore, there is a need for a stroller design that can prevent accidental folding of the stroller and address at least the foregoing issues.

SUMMARY

The present application describes a collapsible stroller apparatus and a method of operating the same. In one embodiment, the stroller apparatus comprises a support frame and a handle defining two lateral sides, and a seat assembled between the two lateral sides. At least one of the two lateral sides has a front leg coupled with a rear leg via a first pivot link, and a side segment of the handle movable relative to the front and rear leg. The seat has a front portion connected with the front leg via a second pivot link and a rear portion connected with the side segment of the handle via a third pivot link. Moreover, a lower end portion of the side segment is in stable abutment against a contact region of the support frame adjacent to the first pivot link for supporting the seat.

In another embodiment, a method of operating the stroller apparatus is described. The method comprises providing the stroller apparatus in an unfolded state, in which a lower end portion of the side segment is kept in stable abutment against a contact region of the support frame adjacent to the first pivot link by a weight load of the seat. For folding the stroller, the handle is moved in a first direction that raises the side segment above the support frame for displacing the contact region of the support frame in a forward direction to a disengaged position out of reach for the lower end portion of the side segment. The handle can then be moved in a second direction that collapse a rear side of the seat downward.

DETAILED DESCRIPTION OF THE EMBODIMENTS

Figure 1:
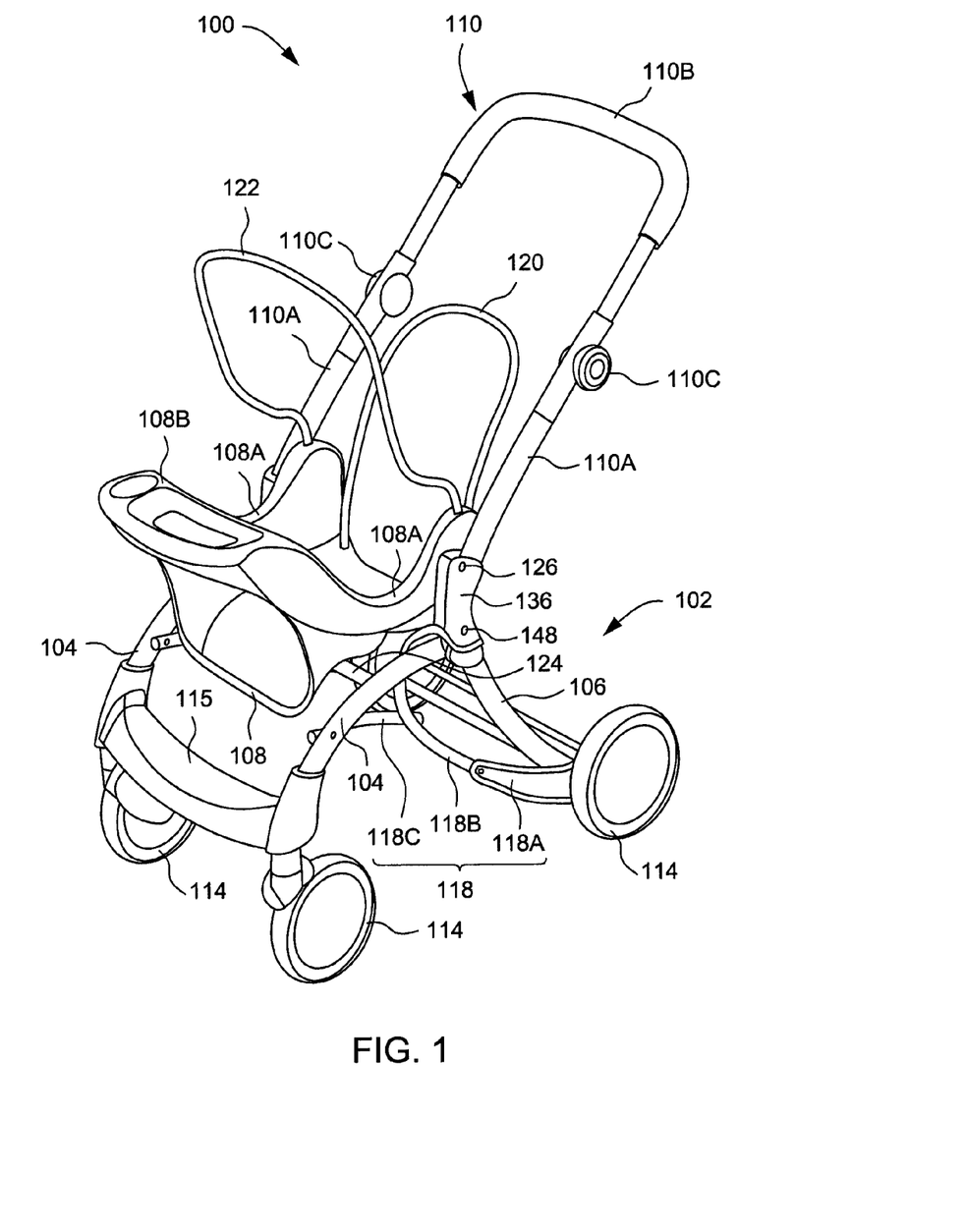
FIG. 1 is a perspective view illustrating one embodiment of a stroller apparatus.

FIG. 1 is a schematic view illustrating one embodiment of a stroller apparatus 100. The stroller apparatus 100 comprises a support frame 102 having front legs 104 and rear legs 106, a seat 108, and a handle 110 pivotally coupled with the seat 108. Upper ends of the front and rear leg 104, 106 on a same side of the seat 108 are connected with each other via a pivot link 112 (better shown in FIG. 2). Lower ends of the front legs 104 and rear legs 106 can be provided with wheels 114 to facilitate transport of the stroller apparatus 100. A footrest 115 can also be fixedly mounted between the front legs 104 for convenient placement of the child's feet.

The handle 110 can have a generally U-shape including two tubular side segments 110A respectively coupled with the left and right sides of the seat 108, and a tubular middle segment 110B joined between the side segments 110A. The middle segment 110B may be pivotally joined with the two side segments 110A via hinges 110C, whereby the middle segment 110B can fold upon the side segments 110A for reducing the length of the handle 110.

For coupling the movements of the front and rear legs 104 and 106 with the handle 110, the support frame 102 also includes a plurality of connecting links 118 that connect one side segment 110A with the front and rear legs 104 and 106 on each side of the seat 108. The connecting links 118 may be formed by the assembly of a plurality of rods, bars or like elongated elements. In one embodiment, the connecting links 118 may include a first linking element 118A fixedly coupled with one rear leg 106, a second linking element 118B coupling the first linking element 118A with a lower end portion of the side segment 110A of the handle 110, and a third linking element 118C coupling the front leg 104 with the second linking element 118B. The assembly of the connecting links 118 enables to drive folding and unfolding movements of the support frame 102 by actuating the handle 110.

As shown in FIG. 1, the seat 108 can include left and right flank sidewalls 108A that can be used as armrests. In one embodiment, the seat 108 and sidewalls 108A can be formed in a single piece by molded plastics, for example. A front side of the seat 108 can include a front tray 108B suitable for placement of various objects (e.g., toys and the like) accessible to the child. A rear side of the seat 108 can be mounted with a backrest frame 120, which may be embodied as a substantially U-shaped tube hinged at a rear portion of the seat 108. The seat 108 may also be provided with a canopy frame 122 that joins with rear ends of the flank sidewalls 108A. The inclination of the backrest frame 120 and canopy frame 122 can be desirably adjusted by respectively rotating these elements relative to the seat 108.

The seat 108 can be assembled between the support frame 102 and the handle 110, which provide support for the seat 108. More specifically, a front portion of the seat 108 can be pivotally coupled with the front legs 104 via a pivot link 124, whereas left and right rear portions of the seat 108 can be respectively coupled with the side segments 110A of the handle 110 via pivot links 126. In turn, the side segments 110A of the handle 110 can rest in stable abutment against a contact region 102A of the support frame 102 (FIG. 2) via gravity action exerted on the handle 110 by a weight load of the seat 108 (in particular, when a child is placed in the seat 108). A latch mechanism 130 (FIG. 2) can be provided between the handle 110 and the support frame 102 for securely locking the handle 110 with the support frame 102 when the side segments 110A rest on the support frame 102. Once the latch mechanism 130 is unlocked, the handle 110 can be operated for folding the stroller apparatus 100 according to a method described hereafter.

Figure 2:
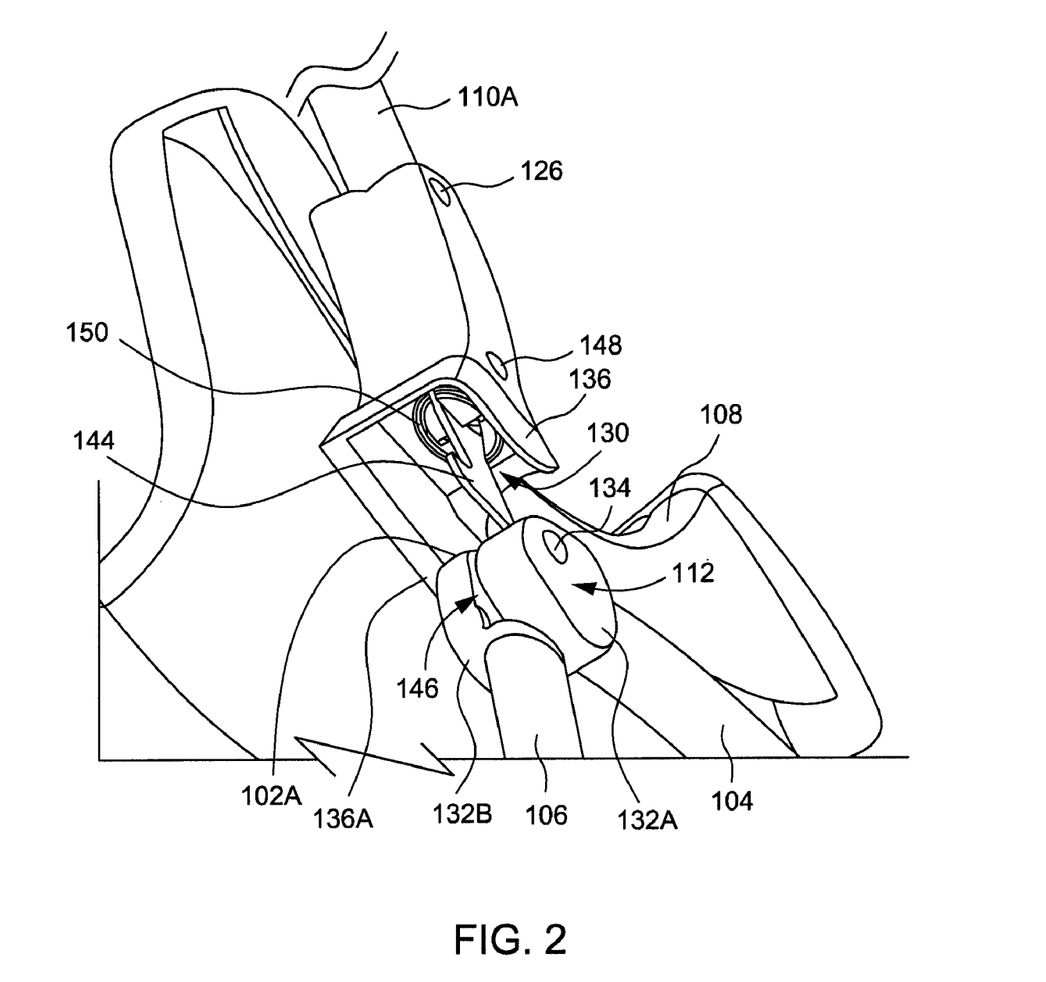
FIG. 2 is an enlarged view of a portion of the stroller apparatus shown in FIG. 1.

FIG. 2 is an enlarged view schematically illustrating in more detail the pivot link 112 between the front leg 104 and the rear leg 106, and the latch mechanism 130. As shown, the pivot link 112 can include pivot knuckles 132A and 132B that are respectively provided on top portions of the front leg 104 and rear leg 106 on each side of the seat 108, and a pivot element 134 (e.g., a rivet) that couples the knuckles 132A and 132B with each other. Accordingly, the front leg 104 and rear leg 106 can rotate relative to each other around the axis defined by the pivot element 134 for folding or unfolding the support frame 102. For preventing accidental clipping of a fingertip between the knuckles 132A and 132B during operation, the lower end portion of each side segment 110A can also include a cover sleeve 136 that can hide at least partially the knuckles 132A and 132B. As shown in FIGS. 1 and 2, the cover sleeve 136 can have an elongated shape provided with a foot-like extension portion 136A through which the second linking element 118B can pivotally connect with the lower end portion of the side segment 110A.

Figure 3:
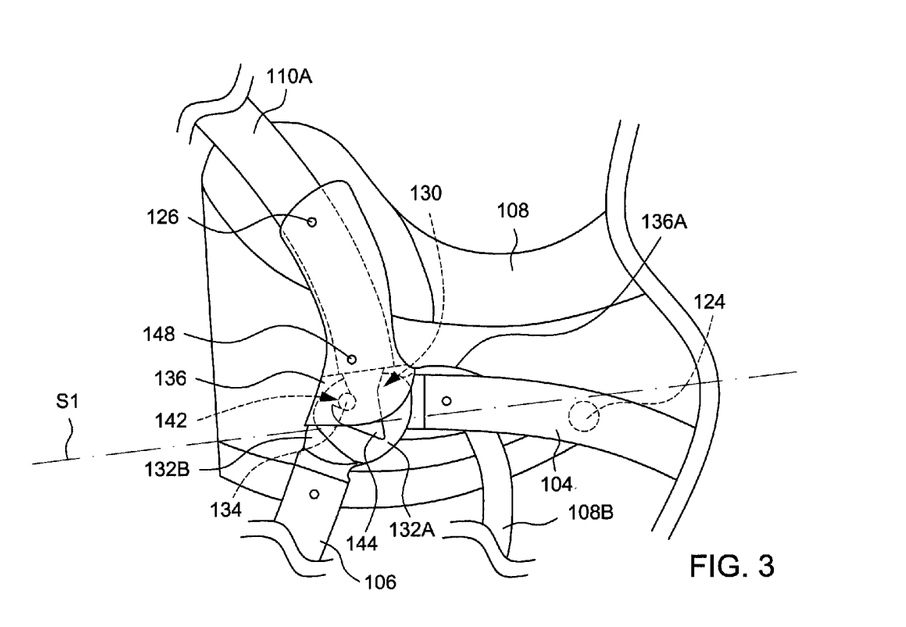
FIG. 3 is a schematic view illustrating the latch mechanism locking the handle with the support frame in an unfolded state of the stroller apparatus.
Figure 4:
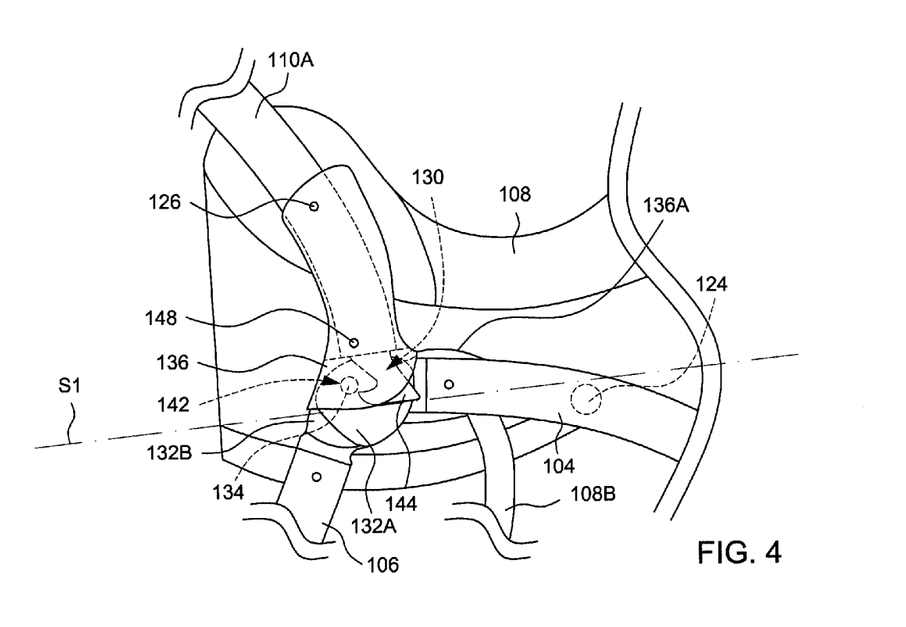
FIG. 4 is a schematic view illustrating the latch mechanism unlocking the handle from the support frame in an unfolded state of the stroller apparatus.

In conjunction with FIG. 2, FIGS. 3 and 4 are schematic views illustrating the operation of the latch mechanism 130. The latch mechanism 130 can include an anchor element 142 fixed on the support frame 102, and a locking element 144 extending outside a lower end portion of each side segment 110A. The locking element 144 can be movable to engage with (as shown in FIG. 3) and disengage from (as shown in FIG. 4) the anchor element 142. In one embodiment, the anchor element 142 can be a portion of the pivot element 134 exposed through a gap 146 (FIG. 2) between the knuckles 132A and 132B. In alternate embodiments, the anchor element 142 can also be a protrusion formed on support frame 102 (e.g., a flange protruding from an inner surface of either of the knuckles 132A and 132B). Moreover, the locking element 144 can be a hook pivotally mounted with the side segment 110A via a hinge 148. The locking element 144 can be actuated via an operating mechanism (not shown) that may include a tension cable, button, spring and like elements. The lower end portion of the side segment 110A where the locking element 144 is disposed can also include an abutting surface 150 having a shape adapted to abut with a contact region 102A of the support frame 102 approximately corresponding to the knuckles 132A and 132B on the top portions of the front and rear legs 104 and 106. As shown, the locking element 144 may be disposed so as to protrude outward approximately from the abutting surface 150.

It is worth noting that while the illustrated embodiment provides one latch mechanism 130 on each side of the stroller apparatus 100, alternate embodiment may also use only one latch mechanism 130 on a single side of the stroller apparatus 100 for locking the handle 110 with the support frame 102.

As shown in FIGS. 1 and 3, when the stroller apparatus 100 is in the unfolded state, the connecting links 118 are extended to unfold the front and rear legs 104 and 106. Moreover, the abutting surface 150 on each lower end portion of the handle 110 can rest in stable contact with the knuckles 132A and 132B on the top portions of the front and rear legs 104 and 106. In this configuration, each side segment 110A and the adjoining front and rear legs 104 and 106 extend in three different directions intersecting at a region approximately corresponding to the pivot links 112 on the two lateral sides of the stroller apparatus 100. In addition, the seat 108 defines a seating plane S1 that is inclined an angle downward from a horizontal plane at the rear portion of the seat 108. In one embodiment, this inclination angle can be about 19 degrees. The inclination of the seating plane S1 and the weight load of the seat 108 can bias the handle 110 in abutment against the top portions of the front and rear legs 104 and 106, such that stable support for the seat 108 can be provided. In this unfolded state, the locking element 144 can also be positioned through the gap 146 between the knuckles 132A and 132B on the respective top portions of the front and rear leg 104 and 106 for engaging with the anchor element 142. Engagement of the locking element 144 with the anchor element 142 can securely fasten the handle 110 with the support frame 102 for locking the unfolded state of the stroller apparatus 100.

Figure 5:
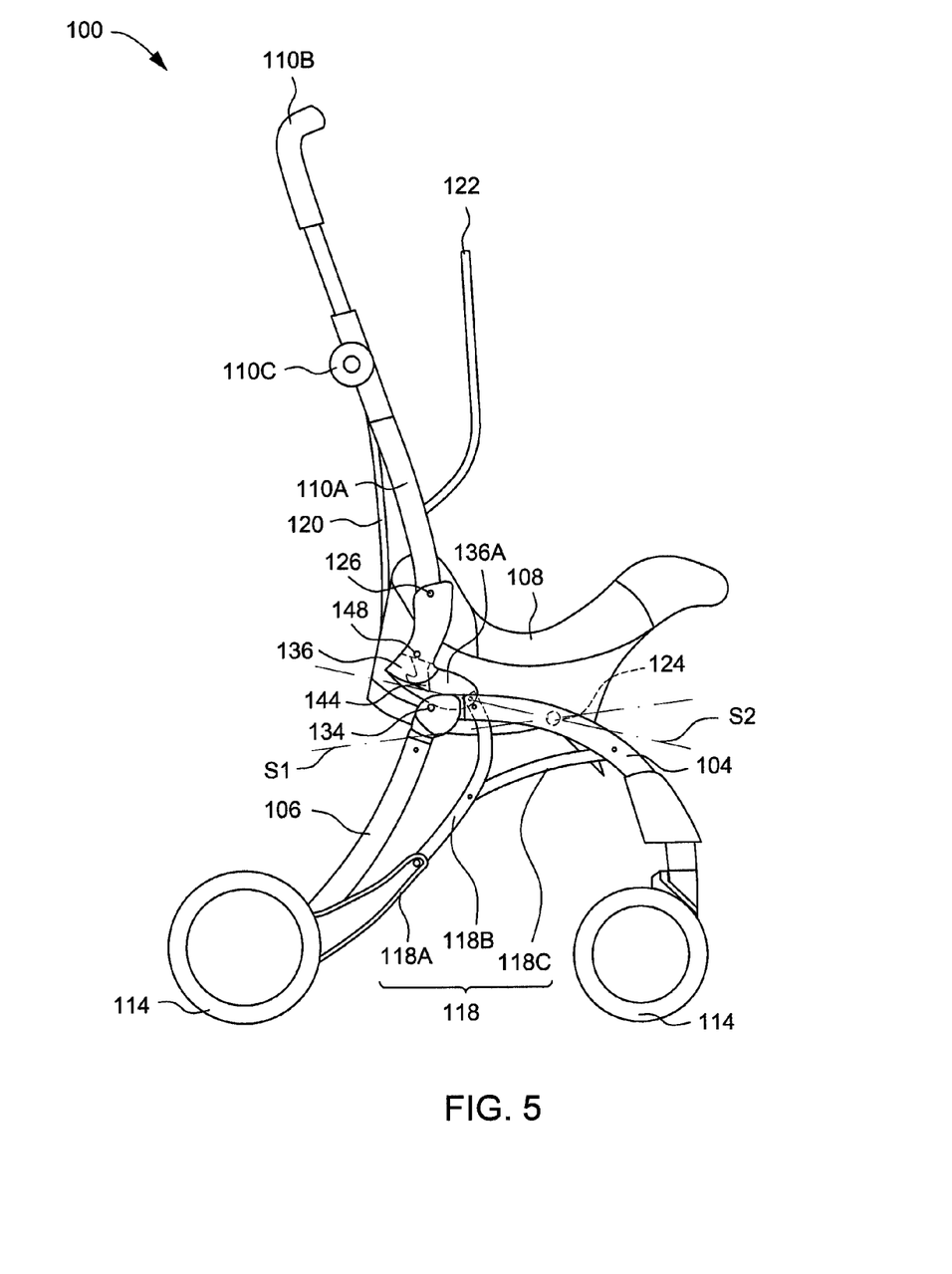
FIG. 5 is a schematic view illustrating an intermediary state of the stroller apparatus during a folding operation.
Figure 6:
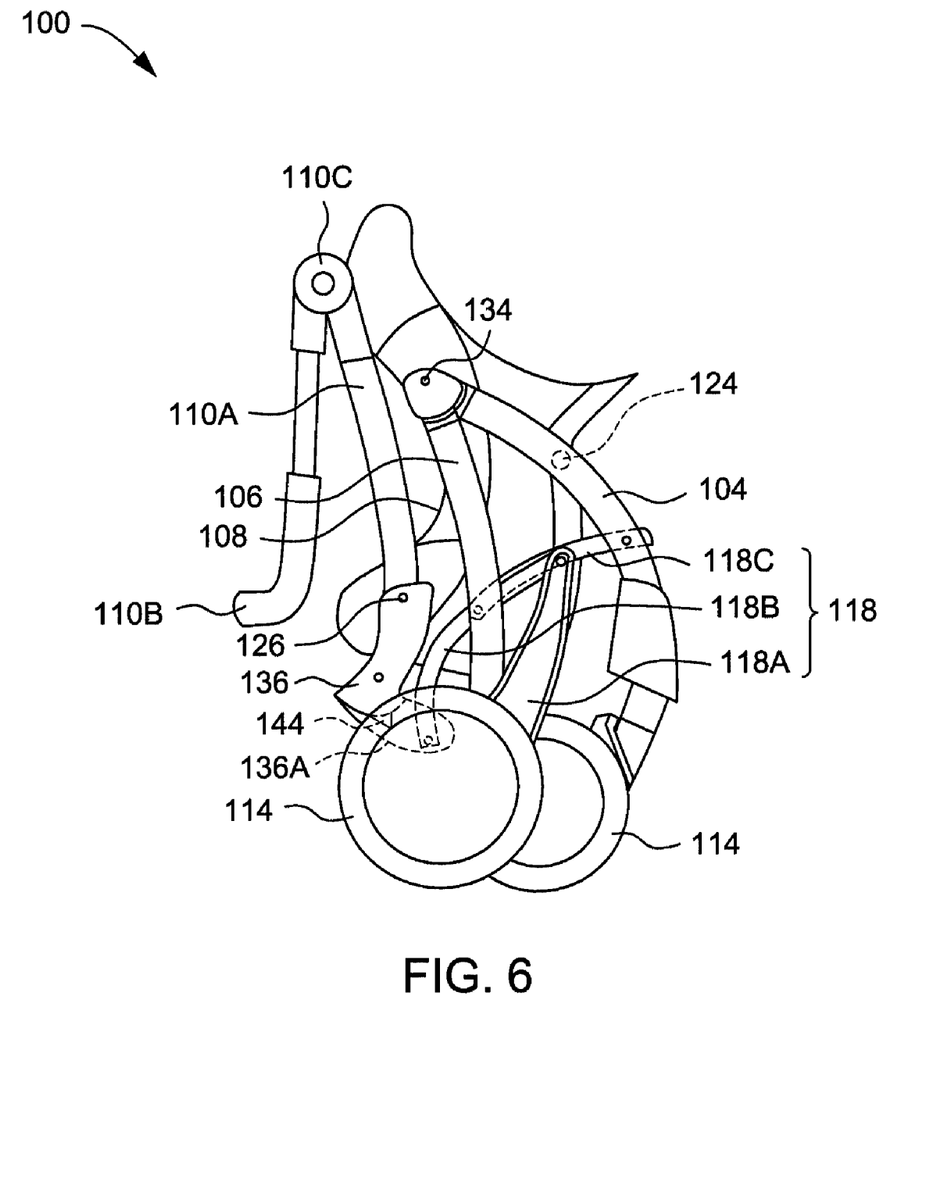
FIG. 6 is a schematic view illustrating a folded state of the stroller apparatus.

FIGS. 5 and 6 are schematic views illustrating a folding operation of the stroller apparatus 100. When the stroller apparatus 100 is to be folded, the latch mechanism 130 first has to be unlocked by disengaging the locking elements 144 from the respective anchor elements 142 (as shown in FIG. 4). As shown in FIG. 5, the unlatched handle 110 then has to be raised above the support frame 102 and rotated relative to the seat 108 by a certain amount of disengaging displacement, which slightly rotates the seat 108 in a forward direction (as shown by the new position S2 occupied by the seating plane of the seat 108). In one embodiment, a requisite disengaging displacement of the handle 110 preferably includes a vertical and horizontal displacement in a ratio of about 7.4 (vertically) to about 10.15 (horizontally), and a forward rotation of the handle 110 by about 30 degrees around the pivot links 126. This disengaging displacement of the handle 110 is converted via the connecting links 118 to a displacement of the front and rear legs 104 and 106, which move toward each other and cause the contact region 102A of the knuckles 132A and 132B to move in a forward direction to a disengaged position out of reach for the abutting surfaces 150 and locking elements 144. Subsequently, the handle 110 can be pushed downward to rotate the seat 108 about the pivot link 124 relative to the front legs 104 in a direction that causes a rear side of the seat 108 to collapse downward. As the handle 110 moves downward, the front and rear legs 104 and 106 are also folded upon each other, driven by the connecting links 118. In addition, the pivot links 112 coupling the top portions of the front and rear legs 104 and 106 shift toward the front side of the collapsed seat 108. As shown in FIG. 6, when the stroller apparatus 100 is fully turned into the folded state, the front and rear legs 104 and 106, seat 108 and handle 110 lie substantially adjacent to one another and the second and third linking elements 118B and 118C are folded upon each other in overlapping positions for reducing a distance between front and rear legs 104 and 106. In addition, the middle segment 110B can also be folded upon the side segments 110A so as to reduce the length of the handle 110. Accordingly, the overall stroller apparatus 100 can be collapsed in a compact manner for facilitating its storage.

It is worth noting that in case the handle 110 is raised less than the requisite disengaging displacement, the weight load exerted from the seat 108 (in particular, when a child is placed in the seat 108) can bias the support frame 102, the seat 108 and the handle 110 toward the unfolded state, owing to the pivot link 124 and the inclination of the seat 108. In other words, if the handle 110 is released from a raised position above the support frame 102 that is less than the requisite disengaging displacement, the weight load of the seat 108 and handle 110 can cause the handle 110 to reversely fall into abutment against the contact regions 102A without external effort. Accidental folding of the stroller apparatus 100 can thus be prevented in an effective manner, even if the latch mechanism 130 fails.

When the stroller apparatus 100 is to be deployed from the folded state shown in FIG. 6 to the unfolded state shown in FIG. 1, the handle 110 can be pulled upward to drive reverse rotation of the seat 108 about the pivot link 124 and unfolding of the front and rear legs 104 and 106, respectively. Once the seat 108 reaches its unfolded position, the lower end portions of the handle 110 are located above the respective contact regions 102A of the knuckles 132A and 132B. The handle 110 then can be lowered and rotated to cause the abutting surfaces 150 to come in abutment with the knuckles 132A and 132B to complete the unfolded state. In the unfolded state, the latch mechanism 130 can lock the handle 110 with the pivot element 134 of the support frame 102 for securely attaching the handle 110 with the support frame 102.

It is worth noting that while the latch mechanism 130 may be operatively turned to the unlocked state when the stroller apparatus 100 is unfolded for facilitating the engagement of the locking element 144 through the gap 146 between the top portions of the front and rear leg 104 and 106, such operation is not necessarily required. Indeed, once the handle 110 moved in the unfolding direction reaches a position above the support frame 102 that is within the range of displacement previously required for disengaging the abutting surface 150 from the contact region 102A, the weight load of the seat 108 and handle 110 can cause the handle 110 to drop downward without external effort. While the handle 110 moves downward, the locking element 144 can be forced to rotate to the unlocked position by contacting with the anchor element 142 in the gap 146. As the abutting surface 150 abuts against the contact region 102A of the top portions of the front and rear legs 104 and 106, the locking element 144 can recover the lock position engaged with the anchor element 142. Accordingly, the latch mechanism 130 can complete the locking operation without the need of external operation.

At least one advantage of the stroller apparatus and operating method described herein is the ability to prevent accidental folding of the stroller, even in case of failure of the latch mechanism. Accordingly, the safety of the stroller can be improved.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A stroller apparatus comprising:
   a support frame and a handle defining two lateral sides, wherein at least one of the two lateral sides has a front leg and a rear leg of the support frame coupled together via a first pivot link, and a side segment of the handle movable relative to the front and rear leg; and
   a seat assembled between the two lateral sides, wherein the seat has a front portion connected with the front leg via a second pivot link and a rear portion connected with the side segment of the handle via a third pivot link,
   wherein a lower end portion of the side segment is in stable abutment against a contact region of the support frame adjacent to the first pivot link for supporting the seat.

2. The stroller apparatus according to claim 1, wherein a latch mechanism between the support frame and the handle is operable to fasten the handle with the support frame when the lower end portion of the side segment is in abutment against the support frame.

3. The stroller apparatus according to claim 2, wherein the latch mechanism includes an anchor element provided on the support frame, and a locking element operable to engage with the anchor element.

4. The stroller apparatus according to claim 3, wherein the locking element is pivotally mounted with the side segment of the handle.

5. The stroller apparatus according to claim 3, wherein the anchor element includes a pivot element coupling a first top portion of the front leg with a second top portion of the rear leg.

6. The stroller apparatus according to claim 5, wherein the locking element is operable to engage with the pivot element through a gap between the first top portion and the second top portion.

7. The stroller apparatus according to claim 6, wherein the side segment of the handle is provided with a cover sleeve adapted to occlude at least partially the gap between the first top portion of the front leg and the second top portion of the rear leg.

8. The stroller apparatus according to claim 1, wherein the lower end portion of the side segment is in abutment against a first top portion of the front leg and a second top portion of the rear leg for supporting the seat.

9. The stroller apparatus according to claim 1, wherein the lower end portion of the side segment is kept in abutment against the contact region of the support frame by a weight load of the seat.

10. The stroller apparatus according to claim 1, wherein the seat defines a seating plane that is inclined from a horizontal direction when the lower end portion of the side segment is in abutment against the contact region of the support frame.

11. The stroller apparatus according to claim 1, wherein the support frame further includes a first linking element fixedly coupled with the rear leg, a second linking element coupling the first linking element with the lower end portion of the side segment, and a third linking element coupling the front leg with the second linking element.

12. The stroller apparatus according to claim 11, wherein the handle is operable to raise the side segment above the support frame by an amount of displacement for moving the contact region of the support frame in a forward direction to a disengaged position out of reach for the lower end portion.

13. The stroller apparatus according to claim 12, wherein the requisite amount of displacement further includes a forward rotation of the handle about the third pivot link relative to the seat.

14. A method of operating a stroller apparatus, wherein the stroller apparatus comprises a support frame including at least a front leg and a rear leg coupled with each other via a first pivot link, a handle having a side segment, and a seat coupled with the front leg and the side segment respectively via a second and third pivot link, the method comprising:

providing the stroller apparatus in an unfolded state, in which a lower end portion of the side segment is kept in stable abutment against a contact region of the support frame adjacent to the first pivot link by a weight load of the seat;

moving the handle in a first direction that raises the side segment above the support frame for displacing the contact region of the support frame in a forward direction to a disengaged position out of reach for the lower end portion of the side segment; and moving the handle in a second direction that collapse a rear side of the seat downward.

15. The method according to claim 14, wherein the lower end portion of the side segment is kept in stable abutment against a first top portion of the front leg and a second top portion of the rear leg when the stroller apparatus is in the unfolded state.

16. The method according to claim 14, wherein the step of moving the handle in a first direction that raises the side segment above the support frame further includes rotating the handle in a forward direction relative to the seat.

17. The method according to claim 14, wherein the stroller apparatus in the unfolded state comprises a latch mechanism that locks the handle with the support frame.

18. The method according to claim 17, further comprising the step of unlocking the latch mechanism before moving the handle in the first direction that raises the side segment above the support frame.

19. The method according to claim 18, wherein the step of unlocking the latch mechanism comprises disengaging a movable locking element from an anchor element fixedly provided on the support frame.

20. The method according to claim 14, wherein the front leg and the rear leg are coupled with each other via a plurality connecting links that fold upon one another in at least partially overlapping positions to reduce a distance between the front leg and the rear leg when the handle is moved in the second direction.

* * * * *